United States Patent
Goto

[15] 3,663,766
[45] May 16, 1972

[54] CONTINUOUS SCANNING MAGNETIC RECORDING AND/OR REPRODUCING SYSTEM AND APPARATUS

[72] Inventor: Kunio Goto, Tokyo, Japan

[73] Assignee: Victor Company of Japan, Ltd., Yokohama, Japan

[22] Filed: July 29, 1970

[21] Appl. No.: 59,311

[30] Foreign Application Priority Data

July 31, 1969 Japan....................................44/60023

[52] U.S. Cl. ................179/100.2 T, 179/100.2 S, 178/6.6 A, 178/6.6 P

[51] Int. Cl. ...............G11b 15/06, G11b 15/44, G11b 21/06

[58] Field of Search .............................179/100.2 T, 100.2 S; 340/174.1 C, 174.1 G, 174.1 H, 174.1 B; 178/6.6 A, 6.6 SF, 6.6 P

[56] References Cited

UNITED STATES PATENTS

| | | | |
|---|---|---|---|
| 3,385,926 | 5/1968 | Tanaka et al. | 179/100.2 R |
| 3,301,946 | 1/1967 | Takayanagi | 178/6.6 A |
| 3,322,892 | 5/1967 | Yasuoka et al. | 178/6.6 A |

*Primary Examiner*—Stanley M. Urynowicz, Jr.
*Assistant Examiner*—Alfred H. Eddleman
*Attorney*—Louis Bernat

[57] ABSTRACT

In a continuous scanning system, a rotary magnetic head scans a magnetic tape with oblique tracks from a beginning end to a terminating end of the tape. When the magnetic head has reached the end of the tape, the rotating direction of the magnetic head and the travelling direction of the magnetic tape are automatically reversed. The magnetic head again continuously and endlessly scans the tape. The magnetic head thus records or reproduces signals on the magnetic tape, upon the above scanning.

12 Claims, 20 Drawing Figures

Patented May 16, 1972 3,663,766

7 Sheets-Sheet 1

INVENTOR.
KUNIO GOTO
BY [signature]

Patented May 16, 1972 3,663,766

7 Sheets-Sheet 2

INVENTOR.
KUNIO GOTO

BY [signature]

Patented May 16, 1972 3,663,766

7 Sheets-Sheet 3

INVENTOR.
KUNIO GOTO

BY [signature]

INVENTOR.
KUNIO GOTO
BY

INVENTOR.
KUNIO GOTO

BY

INVENTOR.
KUNIO GOTO
BY [signature]

INVENTOR
KUNIO GOTO
BY [signature]

CONTINUOUS SCANNING MAGNETIC RECORDING AND/OR REPRODUCING SYSTEM AND APPARATUS

This invention relates to a system and apparatus for continuously recording and/or reproducing video signals by an alternate and continuous scanning of magnetic heads on a magnetic tape, and more particularly to a system and apparatus in which rotary magnetic heads endlessly record and reproduce the video signal with oblique tracks on the magnetic tape.

Generally, a video signal magnetic recording and reproducing apparatus (Video Tape Recorder: hereafter called as VTR apparatus) records and reproduces the video signal by rotary magnetic heads with oblique tracks on a magnetic tape. This type of conventional VTR apparatus permits the magnetic tape to travel single in one direction for recording and reproducing the video signal. Therefore, in this conventional apparatus, the possible recording and reproducing time is determined by the length of the magnetic tape. For example, in a home-use VTR apparatus, the possible recording and reproducing time is about 30 to 60 minutes, at a maximum. This is a very short time for the period of recording and reproducing. When more recording and reproducing time is required to be made by use of this magnetic tape, the magnetic tape must be rewound once again. Thus, during the time of this tape rewinding, the recording and reproducing of the tape can not be performed.

Accordingly, it is the general object of the present invention to overcome the disadvantages of the conventional apparatus as hereinabove described and provide a novel and useful endless recording and/or reproducing system and apparatus.

Another object of the invention is to proviced a system and apparatus which permits continuous recording and/or reproducing of desired signals on the magnetic tape.

Another object of the invention is to provide a system and an apparatus which can automatically reverse the running direction of the magnetic tape after completion of its travel in one direction, and record or reproduce the video signal nearly without interruption at all times of travelling in both forward and reverse directions of the magnetic tape. The recording may continue endlessly, as long as desired.

Still another object of the invention is to provide a system and apparatus which can record nearly continuously and without interruption up to a desired time point, regardless of the recording capacity of the magnetic tape.

Other objects and advantages of the invention will become apparent from the description set forth hereinafter when considered in conjunction with the accompanying drawings, in which.

Figure 1A:
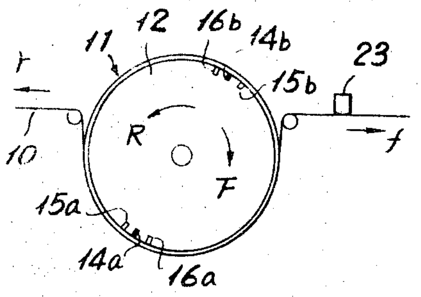
FIGS.1A and 1B are respectively plan and front views of an essential guide drum and magnetic head portion of an embodiment of the apparatus in which the system of this invention has been applied.
Figure 1B:
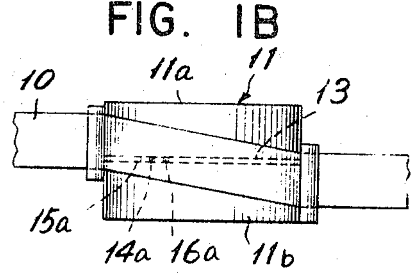
Figures 2A, 2B:
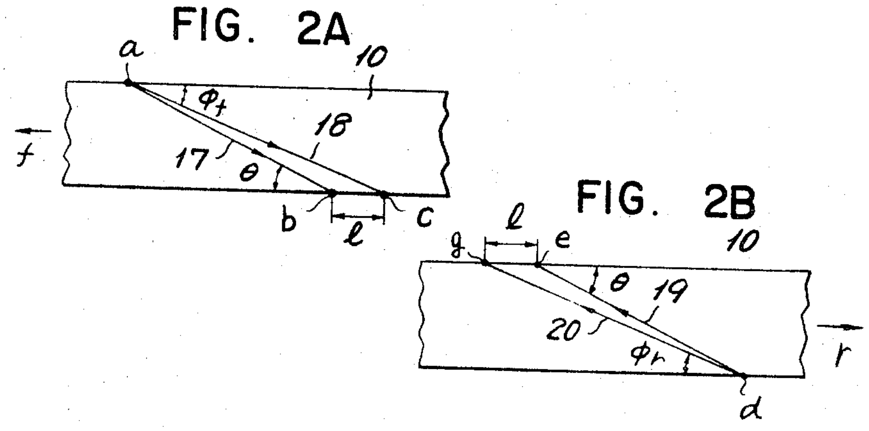
FIGS.2A and 2B are respectively views graphically illustrating the manner of formation of the track on the magnetic tape.
Figure 3:
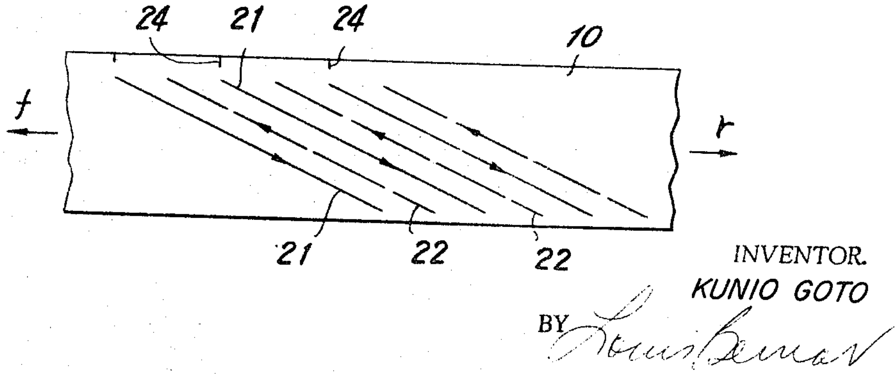
FIG.3 is a view illustrating the principle of track patterns on the magnetic tape recorded by the system according to this invention.

With reference to FIGS.1 to 3, the principle of the system of this invention is now described. In FIGS.1A and 1B, a magnetic tape 10 is wound obliquely along a range of nearly 180° of a guide drum 11. The guide drum 11 includes upper and lower guide drums 11*a* and 11*b*. In FIG.1A, the guide drum 11 is shown with the upper guide drum 11*a* removed. A rotary disk 12 is provided to rotate within a space 13 between the upper and lower guide drums 11*a* and 11*b*. Mounted on the outer periphery of the disk 12 are two recording and reproducing magnetic heads 14*a* and 14*b* positioned in opposite locations in a diametral direction of the disk. Erasing magnetic heads 15*a*, 16*b* and 15*b*, 16*b* are provided, respectively, on both sides of the magnetic heads 14*a* and 14*b* and on the outer periphery of the disk 12.

Now, the magnetic tape 10 may travel in direction *f* while the rotary disk 12 is rotated in the direction of arrow F, in the figure. As shown in FIG.2A a track 17 is formed in a line $\overline{ab}$ inclined in an angle $\theta$ with respect to the tape edge, the track being recorded by the magnetic head 14*a* (or 14*b*). On the other hand, the magnetic tape 10 may be stopped and the direction of travel reversed to *r*, and the rotary disk 12 is also reversed to rotate in a direction of arrow R, in the figure. In this case, a track 19 is formed in a line $\overline{de}$ inclined in an angle $\theta$ with respect to the tape edge, this track also being recorded by magnetic heads 14*a* (or 14*b*), as shown in FIG.2B.

First, the magnetic tape 10 travels at a predetermined speed in a direction of arrow *f* and the rotary disk 12 is rotated in the direction of arrow F. Then, as shown in FIG.2A, the magnetic head 14*a* (or 14*b*) starts to scan from a point *a* at the edge of the tape reaches the lower edge of the tape. During this time, the tape 10 advances by a distance *l*. Therefore, a track 18 is formed in a line $\overline{ac}$ inclined in an angle $\phi_f$ with respect to the tape edge. Next, the magnetic tape 10 travels at a predetermined speed in a direction of arrow *r* and the rotary disk 12 is rotated in the direction of the arrow R. Then, as shown in FIG.2B, the magnetic head 14*a* (or 14*b*) starts scanning from a point *d* at the lower edge of the tape, and it reaches the upper edge of the tape. During this time, the tape 10 advances by a distance *l*. Therefore, a track 20 is formed in a line $\overline{dg}$ inclined in an angle $\phi_r$ with respect to the tape edge. Then, if the absolute values of travelling speed of the magnetic tape 10 respectively in the arrow directions *f* and r are equal, the formula is obtained as $\phi_f = \phi_r$. Therefore, the track 18 and the track 20 are in parallel with each other.

Thus, when operating in a forward mode of the apparatus, the rotary disk 12 is rotated in the arrow direction F and the magnetic tape 10 travels at a speed V (for example, at a speed approximately double the speed in normal recording and reproducing time) in the arrow direction *f*. The signals already recorded on the magnetic tape 10 are erased by the erasing heads 15*a* and 15*b* and a series of new video signals are recorded on the magnetic tape 10, alternately, by the magnetic heads 14*a* and 14*b*. Thus, parallel video tracks 21 are formed on the magnetic tape 10 at predetermined intervals. These tracks are obliquely directed from the upper edge to lower edge of the tape.

When the recording is made as described above and the magnetic tape is taken from the supply reel to the takeup reel, all forward recording is ended. Then, the apparatus is turned to the reverse mode. The rotary disk 12 is rotated in the direction of arrow R, and the magnetic tape 10 is run in the arrow direction *r*. The absolute values of the speeds of the rotary disk 12 and the magnetic tape 10 are, respectively, equal to those of the forward mode as described. Then, the signals already recorded are erased by the erasing heads 16*a* and 16*b*. A series of video signals are recorded in succession to the video signals recorded at the time of forward mode. These signals are recorded on the magnetic tape alternately by the magnetic heads 14*a* and 14*b*. As shown in FIG.3, parallel video tracks 22 are obliquely directed from the lower edge to upper edge of the tape and are thus formed on the magnetic tape 10 at predetermined intervals between each previously recorded track of the video tracks 21. As illustrated in FIGS.2A and 2B, the respective tracks of the video tracks 21 and 22 are parallel with each other.

When magnetic tape 10 is completely rewound from the supply reel to the takeup reel while making a recording, as described above, the mode is instantly changed over again to the forward mode and continues its recording. Similarly, after this, the erasing and recording operation on the magnetic tape is continued endlessly until it comes to a desired time point.

The erasing magnetic heads 15*a* and 15*b* respectively actuate only during rotation in the direction of arrow F, and the erasing magnetic heads 16*a* and 16*b* are respectively actuate only during rotation in the direction of arrow R. The erasing magnetic heads 15*a*, 15*b*, and 16*a*, 16*b* are respectively provided in a position and at a height to scan over the same track on the magnetic tape formed by the recording and reproducing magnetic heads 14*a* and 14*b*. The erasing magnetic heads 15*a*, 15*b*, and 16*a*, 16*b* are preferably larger in width than the recording and reproducing magnetic heads 14*a* and 14*b* so that they can fully erase the already recorded tracks.

In order to perform erasing and recording more correctly as desired, the phase relationship between the tape travel and the rotation of the rotary disk is required to be controlled in response to the forward mode time and the reverse mode time. Therefore, control pulses 24 are recorded during travel in only one direction, recording being made on one edge of the magnetic tape 10, in response to the video tracks as shown in FIG.3, and by a control magnetic head 23 as shown in FIG.1 During the endless recording and reproducing period, the recording and reproducing are made by the recording and reproducing magnetic heads 14*a* and 14*b* while reproducing the control pulses 24. Thus, the magnetic heads 14*a* and 14*b* can correctly scan on each track of the tracks 21 and 22.

In the embodiment hereinabove described, the rotary disk 12 is rotated clockwise in the direction of arrow F during the travel of the magnetic tape 10 in the direction of arrow *f*. However, the rotary disk 12 may be rotated in the counter-clockwise direction in the direction of the arrow R during the magnetic tape 10 travel in the direction of arrow *f*. Similarly, in this instant, the rotary disk 12 may be rotated in the direction of arrow F during the magnetic tape travel 10 in the direction of arrow *r*. Then, the video tracks 21 and 22 are disposed in parallel with each other. Furthermore, the angle made by each track of the video tracks 21 and 22 and the tape edge is larger than the angle made in the above described embodiment.

The practical embodiments incorporating the principle of this invention as hereinbefore described may be itemized as follows:

(I) CONTINUOUS REPRODUCING APPARATUS

Figure 4:
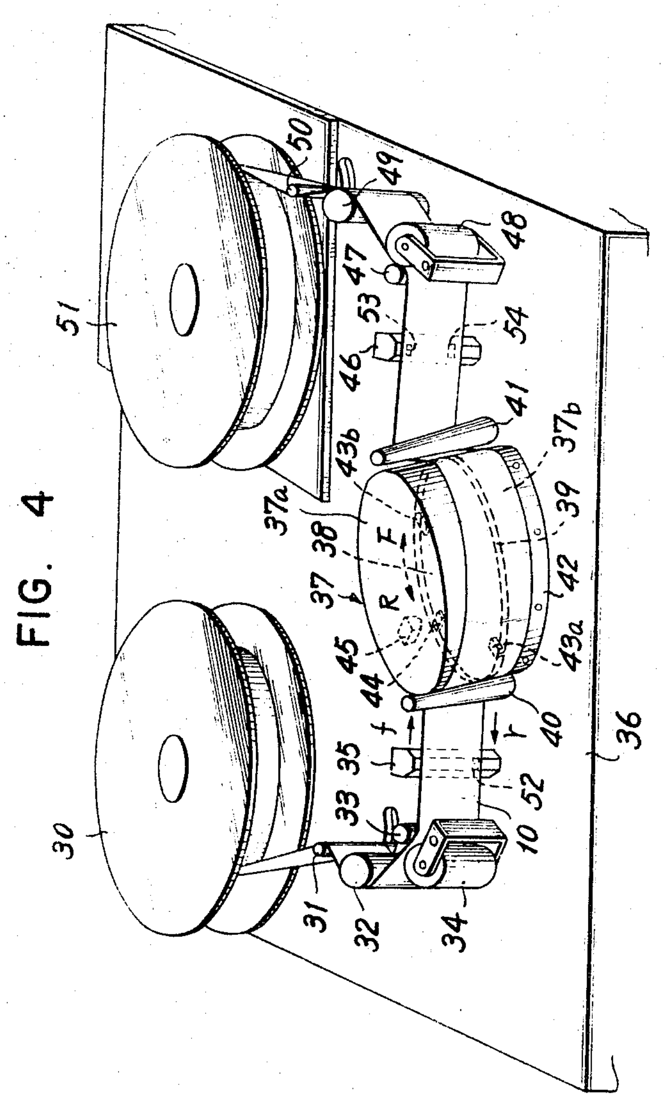
FIG.4 is a perspective view of an embodiment of the VTR apparatus according to this invention.

An embodiment of a VTR apparatus incorporating the system of this invention and specifically used for reproducing is shown in FIG.4. The magnetic tape 10 unwound from a supply reel 30 passes along a tension pole 31 and a guide roller 32 and further travels between a capstan 33 and a pinch roller 34 in the direction of arrow *f*. After contacting a fixed magnetic head block 35, the magnetic tape 10 is wound around a peripheral surface of a guide drum 37 fixed obliquely to a base plate 36. The guide drum 37 includes upper and lower guide drums 37*a* and 37*b*. A rotary disk 38 is provided in the guide drum 37 so as to rotate in a space 39 between the upper and lower guide drums 37*a* and 37*b*. The magnetic tape 10 is adjusted, in its winding range around the guide drum 37, by guide poles 40 and 41. The tape wraps around the drum in a slightly larger range than 180°. Also, the magnetic tape 10 is guided its lower edge by a tape guide 42 and wound obliquely with respect to the space 39.

Video reproducing magnetic heads 43*a* and 43*b* are provided on opposite sides of the rotary disk 38. The disk 38 is provided with a magnet 44. In the guide drum 37, a tone wheel head 45 is provided to cooperate with the magnet 44.

Passing along the guide pole 41, the magnetic tape 10 contacts a fixed head block 46 and thereafter passes between a capstan 47 and a pinch roller 48. The magnetic tape 10 further passes along a guide roller 49 and a tension pole 50 and thereafter is wound on a takeup reel 51. The tension poles 31 and 50 serve as sensing poles, as later described.

Figure 5:
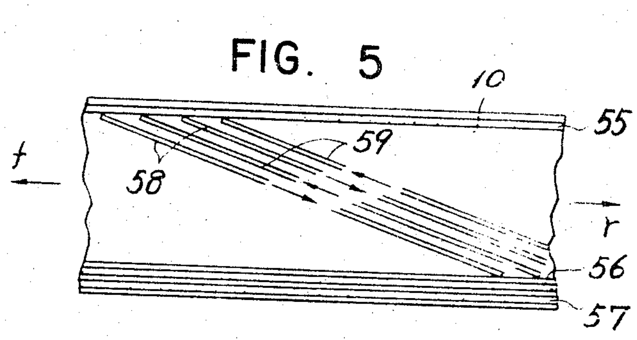
FIG.5 is a view of track patterns on the magnetic tape.

The magnetic tape 10 has a control track 55 formed at the upper edge thereof. An audio track 56 (for the forward mode) and an audio track 57 (for the reverse mode) are respectively formed at the lower edge thereof, as shown in FIG.5 Also formed on the magnetic tape 10, are video tracks 58 during the forward mode. These tracks are obliquely directed from the upper edge to lower edge of the tape in the space between the tracks 55 and 56. Video tracks 59 are similarly formed for the reverse mode, obliquely directed from the lower to upper edges of the tape. The tracks 59 are formed between and in parallel with each track of the tracks 58. Each of the tracks 58 and 59 records the information required for one field of the video signal.

During a forward reproducing mode, the pinch roller 48 contacts, in compression with the capstan 47, and causes the magnetic tape 10 to travel. The pinch roller 34 is detached from the capstan 33. After it is unwound from the supply reel 30, the magnetic tape 10 travels in the direction of arrow *f* and is wound on the takeup reel 51. At this instant, the rotary disk 38 is rotated at a speed of 30 revolutions per second in the direction of arrow F. The tension pole 31 is provided on a tension arm (later described) operable in association with a brake of the supply reel 30. Regardless the amount of tape wound on the reel 30, the pole 31 maintains the back tension of the tape 10 nearly constant.

During the travel of the magnetic tape 10 in the direction of arrow *f*, the reproducing magnetic heads 43*a* and 43*b* rotate in the direction of arrow F. They alternately scan and reproduce the tracks 58 in sequence. At the same time, a control head 53 scans and reproduces the control track 55. The reproduced control signal is used for controlling the rotation of the rotary disk 38, as later described. Also, an audio reproducing magnetic head 54 scans and reproduces the audio track 56.

As the magnetic tape 10 is wound on the takeup reel 51, in a predetermined amount, the apparatus is made to the reverse mode by automatic reverse means as later described. The magnetic tape 10 is reversed in its direction of travel. At this time, the pinch roller 48 is detached from the capstan 47 and the pinch roller 34 is compressed against the capstan 33. Thus, the magnetic tape 10 travels in the direction of arrow *r*. The reproducing magnetic heads 43*a* and 43*b* rotates in the direction of arrow R and alternately scan and reproduce in sequence the tracks 59 on the magnetic tape 10. An audio reproducing magnetic head 52 scans and reproduces the track 57.

The guide poles 40 and 41 are preferably determined by an inclination so as to prevent the magnetic tape 10 from being floated away from the tape guide 42 due to variation of the travelling direction of the magnetic tape 10. Thus, the tape 10 is always compressed against the tape guide 42 side and travels stably.

Because the travelling direction of the magnetic tape 10 and the rotating direction of the rotary disk 38 are reversed at a time point of change from the forward mode to the reverse mode, an interruption in the reproducing signal occurs for a few seconds. During this interval, the signal output is changed to the E—E system by which a title of a program or other picture image can be produced on the reproduced picture.

Figure 6:
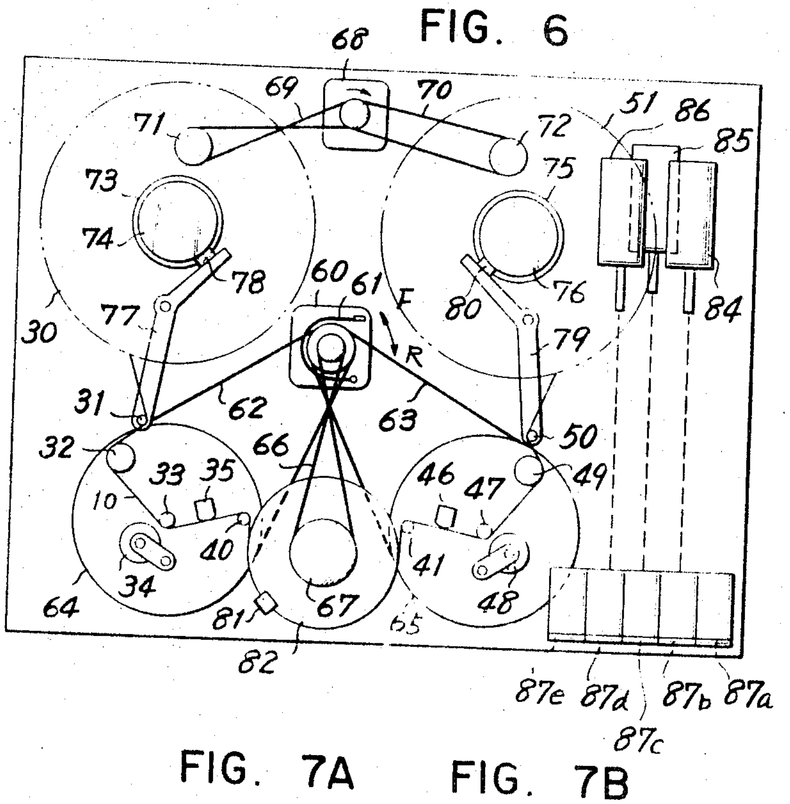
FIG.6 is a plan view of driving mechanism portions of the apparatus as shown in FIG.4.

A driving mechanism for the apparatus shown in FIG.1 is now illustrated in FIG.6 A motor 60 is a used for driving the rotary disk and capstan. The motor 60 can be rotated in both directions of F and R as shown by arrows corresponding to the modes. In the change of the rotary direction, a brake 61 is operated to quickly stop the motor 60 and saves the time necessary for the change of modes. The rotation of the motor 60 is transmitted to capstan flywheels 64 and 65 through belts 62 and 63. The rotation of the motor 60 is also transmitted through a belt 66 to a pulley 67 fixed to the rotary disk 38. A motor 68 for driving the reel is always rotated in the arrow direction. The rotation of the motor 68 is transmitted to idlers 71 and 72 through belts 69 and 70. Reel disks 73 and 75 are respectively soft-coupled with reel disks 74 and 76. During the forward mode, the idler 72 is compressed against the disk 75. The reel 51 is rotated by power supplied through the idler 72 and the reel disks 75 and 76. The reel 51 winds the tape in constant tension without loosening. During fast-forward motion of the magnetic tape, the idler 72 is compressed to the reel disk 76. During the reverse mode, the idler 71 is compressed to the reel disk 73 in the similar way.

A tension arm 78 with is provided the tension pole 31 at one end thereof and has a brake pad 78 at the other end thereof. This arm is biased to make contact with the reel disk 74. When the tension of the magnetic tape 10 is increased, the tension arm 77 is rotated clockwise, as viewed in the figure. Therefore, the frictional braking force exerted on the reel disk 74 by the brake pad 78 is much lessened. Conversely, when the tension of the tape is decreased, the braking force of the brake pad 78 is increased. Thus, the tension of the tape 10 is maintained constant. The same action is produced about a tension arm 79 which has a brake pad 80.

An electromagnetic brake 81 provides braking on a rotary plate 82 provided integrally with the pulley 67. When braking is applied on the rotary plate 82 by the electromagnetic brake 81, the belt 66 slips against the pulley 67. Consequently, the rotating speed of the pulley 67 is reduced, and thus the rotation frequency of the rotary disk 38 is controlled. The rotating speed of the motor 60, the diameter of the pulley 67, and other factors, are preferably fixed so that the pulley 67 may rotate more rapidly than 30 rotations per second when the electromagnetic brake 81 is out of operation.

The sensing poles 31 and 50 serve as tension poles to detect a sensing tape which is electroconductive. The sensing tape is adhered on a back surface opposite to a magnetic surface of the magnetic tape 10. A signal detected by the sensing pole actuates a forward reproducing plunger 84, a stop plunger 85, or a reverse reproducing plunger 86. Corresponding to the plungers 84 to 86, buttons 87*b* to 87*d* are provided together with a fast-forwarding button 87*a* and a rewinding button 87*e*.

An embodiment of the automatic reverse control system is now illustrated with reference to FIGS.7A to 7D.

Figure 7A:
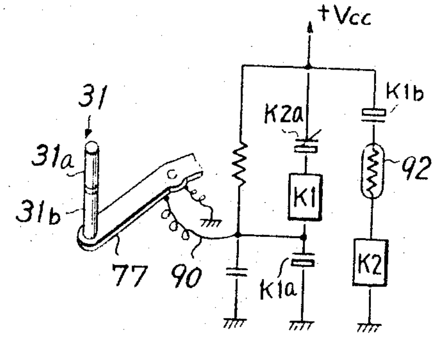
FIGS.7A to 7D are combined block and schematic diagrams showing a circuit system of an embodiment of an automatic reverse control system.

In FIG.7A, when the forward reproducing mode is finished, the electroconductive sensing tape cemented to the end of the magnetic tape contacts the sensing pole 31. At the same time, upper and lower pole portions 31*a* and 31*b* of the sensing pole 31 is short-circuited through the sensing tape. Therefore, a line 90 is grounded through the arm 77 having the sensing pole 31. Prior to the contacting of the sensing tape with the sensing pole 31, a relay contact K1*a* is opened and a relay contact K2*a* is closed. Accordingly, as the line 90 is grounded as above described, an electric current flows through the relay K1 to actuate it. By action of the relay K1, the contact K1*a* is closed. Thus, the relay K1 is self-held in action. The contact of the sensing tape to the sensing pole 31 is then memorized in the above circuit.

At this instant, an electric current flows in the relay K2 through the contact K1*b* closed by action of the relay K1 and a resistor 92. However, the resistance value of the resistor 92 is large at the beginning of the electric flowing, the flowing current value is very small so that the relay K2 can not operate. The resistor 92 has a negative temperature characteristic. After a lapse of 20 to 30 seconds of electric flowing, the temperature of the resistor 92 rises and the resistance value is lowered. By the lowering of the resistance value of the resistor 92, the relay K2 is actuated. By action of the relay K2, a contact K2*a* is opened and thereby the relay K1 is released from the self-holding.

During transition period from the forward reproducing mode to the reverse reproducing mode, there is once provided a stop mode. In this sequential change of modes, the magnetic tape 10 does not nearly travel. To prevent the sensing detection from occurring again, the relay K1 is self-held for 20 to 30 seconds so as to be insensible to the sensing tape during this time period. When the relay K1 releases, the contact K1*b* is opened, and current terminates in the resistor 92. Its temperature comes down to prepare for a subsequent action.

Figure 7B:
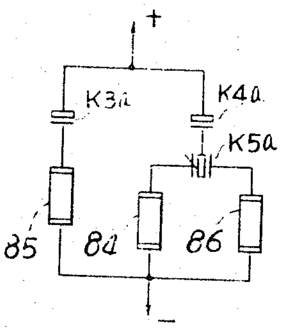
Figures 7C, 7D:
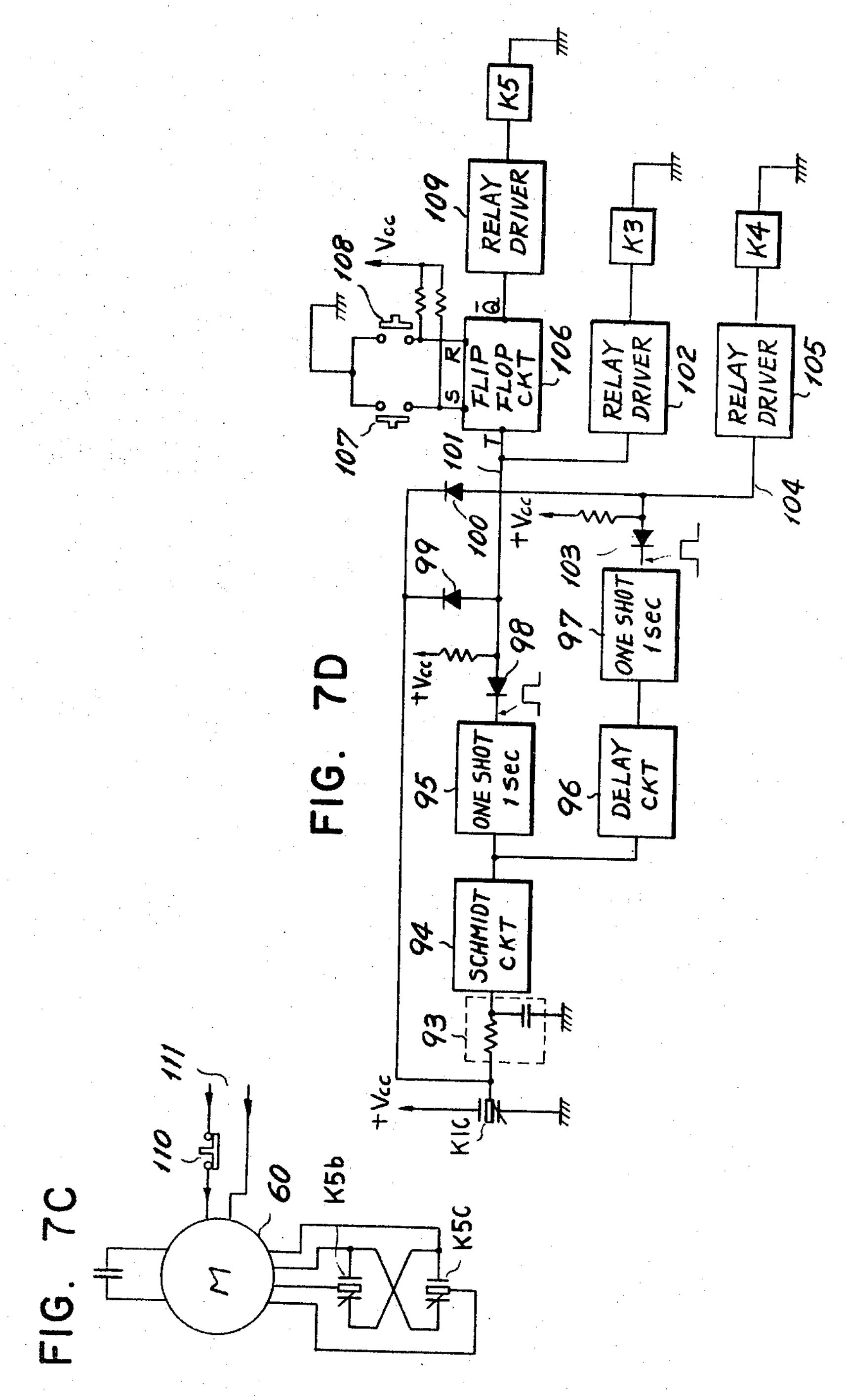

A sequence control circuit is shown in FIG. 7D for changing from the forward reproducing mode through the stop mode to the reverse reproducing mode. By operation of the relay K1, a contact K1*c* closes and its common contact is connected to a power source voltage +Vcc. This applied voltage passes through a low-pass filter 93 for preventing chattering of the contact K1*c*. The voltage is applied in a Schmidt circuit 94. The Schmidt circuit 94 is a wave forming circuit which compares, in level, the input voltage with a certain threshold level and generates an output voltage of zero or +Vcc. The output of the Schmidt circuit 94 serves as a trigger signal for one-shot multivibrators 95 and 96.

An output rectangular wave of the one-shot multivibrator 95 is led to line 101 through a diode 98. While the relay K1 is released and the common contact of the contact K1*c* is at ground potential, the line 101 is grounded through the diode 99. The rectangular wave does not appear on the line 101. Accordingly, even though the one-shot multivibrator 95 makes an erroneous operation, it does not affect the subsequent circuit. Then, the contact K1*c* is switched over and the output appears in the line. The output on the line 101 is supplied through the relay driver 102 to a relay K3. The relay K3 is then operated. By action of the relay K3, a contact K3*a* shown in FIG.7B is closed and the stop plunger 85 is actuated. When the stop plunger 85 actuates, a stop switch 110 of FIG.7C is opened. The motor 60 is thus disconnected from the AC source line 111, and it stops its rotation. At the same time, the rake 61 operates, and the motor 60 is quickly stopped.

The rectangular wave on the line 101 is supplied to a flip-flop circuit 106 having input terminals T, S and R and an output terminal $\overline{Q}$. The circuit 106 is a flip-flop circuit of the master-slave type. The flip-flop circuit 106 is triggered by a trailing edge of the rectangular wave from the one-shot multivibrator 95. Accordingly, at the moment when the contact K1*c* operates, a rectangular wave is applied to the terminal T of the flip-flop circuit 106, and the polarity of the output, at the output terminal $\overline{Q}$, is reversed. The terminals S and R are respectively set and reset terminals. A switch 107 is closed at the forward reproducing mode, and a switch 108 is closed at the reverse reproducing mode. When the switch 107 is closed and the set terminal S is grounded, the output voltage of the output terminal $\overline{Q}$ turns to zero. Also, when the switch 108 is closed and the reset terminal R is grounded, the output voltage of the output terminal $\overline{Q}$ becomes +Vcc. The output of the flip-flop circuit 106 is applied on a relay K5 through a relay driver 109.

Now, in the forward mode, the switch 107 is closed. The terminal S of the circuit 106 is grounded and the output of the output terminal $\overline{Q}$ is then zero. If the sensing pole 31 detects the sensing tape, the rectangular pulse is applied to the input terminal T of the circuit 106 as hereinbefore described. Accordingly, the output of the output terminal $\overline{Q}$ is reversed, and then the relay K5 is operated. By operation of the relay K5, a contact K5*a* is changed to connect the reverse plunger 86 with the contact K4*a*. Also, contacts K5*b* and K5*c* are changed so as to reverse the direction of rotation of the motor 60.

On the other hand, the output of the Schmidt circuit 94 is supplied, through a delay circuit 96 having 4 seconds delay time, to the one-shot multivibrator 97. The output of the one-shot multivibrator 97 passes through a diode 103, line 104, relay driver 105, and supplied to a relay K4. As the common contact of the contact K1*c* is grounded, the line 104 is grounded through a diode 100. When the relay K4 operates, a contact K4*a* is closed in FIG.7B.

When the contact K4*a* is closed, the reverse plunger 86 is actuated through the contact K5*a* which has already been operated by the relay K5. Because the relay K4 operates as delayed in a delay time (4 seconds) by the delay circuit 96 after operation of the relay K3, the stop plunger 85 is already actuating when the reverse reproducing plunger 86 actuates. The motor 60 is already stopped.

By action of the reverse plunger 86, the stop switch 110 is closed and the power source is connected to the motor 60. At this time, as the contacts K5*b* and K5*c* shown in FIG.7C has been already changed by operation of the relay K5. The wire-connection of the motor 60 is reversely-connected. The motor 60 is rotated in the reverse direction. Also, by action of the reverse plunger 86, the switch 107 is opened and the switch 108 is closed. By closing the switch 108, the terminal R is grounded. However, as the output has already appeared at the output terminal $\overline{Q}$, the output is not changed.

In this embodiment, the apparatus reaches the stop mode following the forward mode. Stop motion occurs responsive to operation of the stop plunger 85, and after a lapse of 4 seconds, it operates in the reverse mode. After the apparatus is in in the reverse mode, the motor 60 begins to rotate in the reverse direction. It takes about 4 to 5 seconds to bring the motor 60 into the normal rotating speed. Therefore, in this embodiment, it takes totally about 8 to 9 seconds to change the apparatus from the forward mode to the reverse mode. During this changing there are disturbances in the signals reproduced from the magnetic tape. If a delay circuit which has a delay time more than 8 to 9 seconds is inserted in parallel with the one-shot multivibrator 95 or 97 and the video output is changed to other video input signal, during this period, it is possible to effect other picture image such as title and the like on the reproducing picture during this mode changing period.

If the sensing tape is cemented at only the terminating end of the tape 10, there is a change from the forward reproducing mode to the reverse reproducing mode. Also, if the sensing tape is applied at the beginning and terminating ends on the magnetic tape 10, the change is endlessly between the forward reproducing mode and the reverse reproducing mode.

An embodiment of a head servo system is illustrated in below with reference to FIG. 8. In the VTR apparatus of this embodiment, a head servo system only can be employed for controlling a rotation speed of the rotary disk 38. The magnetic tape 10 travels at a constant speed. Power is supplied to the motor 60 from AC source line 120. By a rotation of the motor 60, the capstan 47 (33) is rotated at a constant speed through the belt 63 (62). On the other hand, the power of the motor 60 is transmitted through the belt 66 to the pulley 67. Thus, the rotary plate 82, the rotary disk 38 and shaft 121 are rotated. The rotation speed of the rotary disk 38 is somewhat more rapid than 30 rotations per second.

As the rotary disk 38 is rotated, its rotation speed is detected since a tone wheel pulse is generated by the tone wheel head 45, cooperating with the magnet 44 fixed at the disk 38. The tone wheel pulse from the head 45 is supplied to a head servo circuit 122. On the other hand, the control signal of the control track 55 on the magnetic tape 10 is reproduced by the control head 53. The reproduced signal from the head 53 is supplied through a delay circuit 123 to the head servo circuit 122. In the head servo circuit 122, the phase of the tone wheel pulse from the head 45 is compared with the control signal from the head 53. The differential output of the phase comparison from the head servo circuit 122 is supplied to the electromagnetic brake 81. The electromagnetic brake 81 provides a braking force to the rotary plate 82. Therefore, the rotation of rotary disk 38 is rotated, correctly at 30 rotations per second.

The delay circuit 123 is the circuit for the correction of mistracking when the video reproducing heads 43a and 43b scan on the tracks 58 and 59. The delay time of the delay circuit 123 can be varied.

Figure 9:
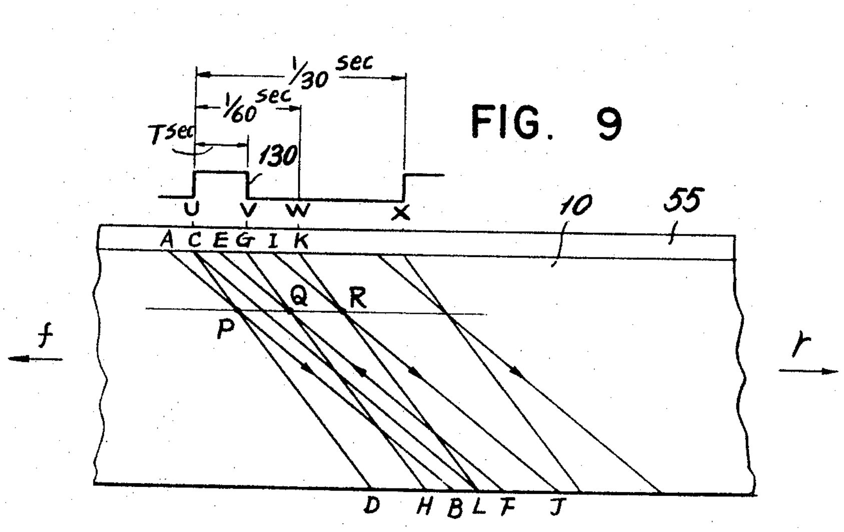
FIG.9 is a view showing the track pattern illustrating the tracking of a magnetic head on the magnetic tape.

Even after the reproducing mode has been changed, the reproducing magnetic heads 43*a* and 43*b* are required to correctly trace both the tracks 58 during the forward reproducing mode and the tracks 59 during the reverse reproducing mode. The following disclosures show an embodiment of a method for the performance of this correct tracking, as illustrated with reference to FIG. 9.

The control track 55 on the upper edge of the magnetic tape 10 has a recorded control pulse signal of a rectangular wave shown by line 130. In the same figure, the line of the control pulse signal 130 is shown slightly shifted upwards for the convenience of illustration so that the scanning track of the reproducing magnetic head may be a line $\overline{CD}$ (provided that the magnetic tape 10 is stopped) at the instant when the control head 53 has detected an end U which is the rising-up of the control signal 130. The control pulse signal 130 has a pulse width of T seconds smaller than (one-sixtieth second) shown between ends U and V.

Lines $\overline{CK}$, $\overline{KL}$ and $\overline{GH}$ on the magnetic tape 10 are still track patterns of loci formed by rotation of the reproducing magnetic heads 43*a* and 43*b* on the magnetic tape 10 being stopped. Lines $\overline{AB}$ and $\overline{IJ}$ are dynamic track patterns of the loci formed during the forward reproducing mode and a line $\overline{FE}$ is a dynamic track pattern of the locus during the reverse mode, respectively.

If the control head 53 detects the trailing edges U and X of the pulses during the forward mode, it detects the leading edge V of the rising pulse 130 during the reverse mode. The output of the control head is generally a differential output of the control pulse. Now if the reproducing magnetic head 43*a* is at a point P on the still track pattern $\overline{CD}$ of the stopped magnetic tape 10 when the control head 53 has detected the end U of the control pulse 130, the dynamic track pattern on the magnetic tape 10 running during the forward mode becomes a locus as shown by $\overline{AB}$. A line $\overline{CL}$ is parallel with the line $\overline{AB}$. On the other hand, the reproducing magnetic head 43*b* passes a point R on the still track pattern $\overline{KL}$ and scans on a track $\overline{IJ}$ parallel to the line $\overline{CL}$. The point R corresponds to a point W separated by one-sixtieth second interval measured from the trailing edge. During the reverse mode, the control head 53 detects the end V of the pulse 130 and the reproducing magnetic head 43*a* scans on a track $\overline{FE}$ in the similar way.

So that the track $\overline{FE}$ may be located at substantially exact center between the tracks $\overline{AB}$ and $\overline{IJ}$, the leading edge V must be situated at the center between the trailing edge U and the point W. Accordingly, T seconds are one-half of one-sixtieth second, i.e., one one-hundred twentieth second. As it is one-thirtieth second between the trailing edge U and the leading edge X, the duty cycle of the pulse 130 is 25 percent. In order that the tracks during the reverse mode may be at the center between tracks during the forward mode, the leading edge V may be located at the center between the point W and the leading edge X. Accordingly, the duty cycle of the pulse 130 may be provided for 25 percent or 75 percent. Thus, it may be provided that T= 1/120 second or 1/40 second.

Figure 8:
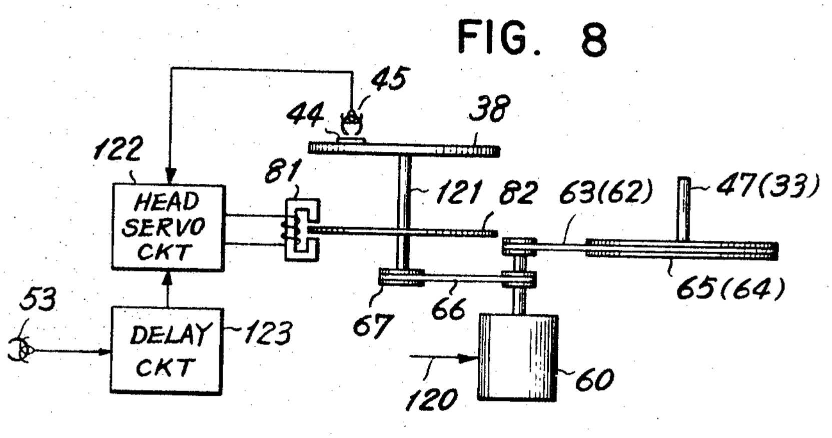
FIG.8 is a diagrammatic view of an embodiment of a capstan servo system.

Instead of selecting the duty cycle of the control pulse signal 130 as above described, the delay amount of the delay circuit 123 in the servo system as shown in FIG. 8 may be changed during the forward mode and the reverse mode.

(II) CONTINUOUS RECORDING AND REPRODUCING APPARATUS

The meaning of the recording mode includes a normal recording mode in which either the previously recorded signals are erased and new signals are recorded on the same track; or, there is a virgin recording mode in which new recording tracks are formed on an unrecorded tape. For the mode switches, there are provided a virgin recording mode switch in addition to an ordinary recording mode switch. In the virgin recording mode, an auto reversing is prevented when the forward recording is terminated. The line 104, shown in FIG.7D, is grounded when the virgin recording mode switch (not shown) is depressed. When the sensing pole 31 detects the sensing tape, the tape 10 can be automatically stopped.

In the apparatus of this embodiment, video recording and reproducing magnetic heads 14*a* and 14*b* and erasing magnetic heads 15*a*, 15*b* and 16*a*, 16*b* are provided as shown in FIG.1A, in place of video reproducing magnetic heads 43*a* and 43*b* on the rotary disk 38 of the apparatus as shown in FIG.4. Moreover, the magnetic heads 52 and 54, as shown in FIG.4, serve as audio recording and reproducing magnetic heads. And further, audio erasing magnetic heads (not shown) respectively precede these magnetic heads 52 and 54. The driving mechanism is the same as shown in FIG.6.

Figure 10:
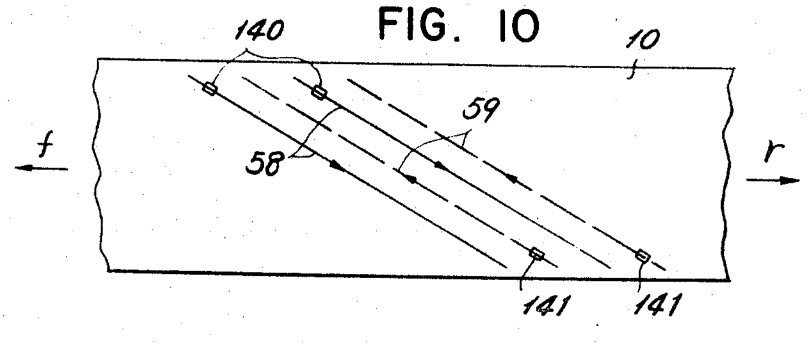
FIG.10 is a view showing the track patterns on the magnetic tape indicating the position of vertical synchronizing signal.
Figure 11:
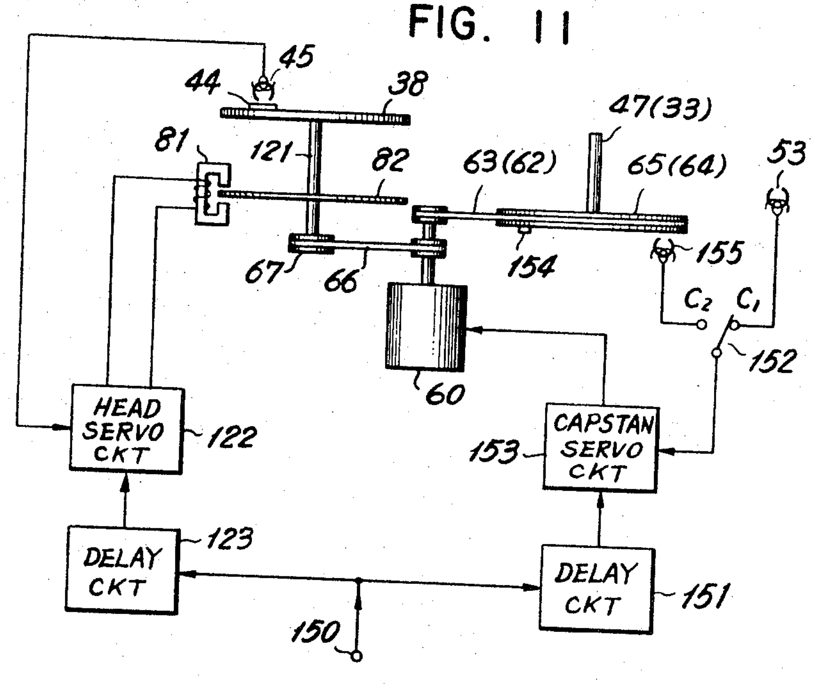
FIG.11 is a diagrammatic view of an embodiment of a capstan servo system and a head servo system.

In the recording mode, (1) the track of each forward and reverse mode must be correctly scanned by the video magnetic head, and (2) the recording of the vertical synchronizing signal of the video signal is located at a predetermined position. As shown in FIG.10, for example, vertical synchronizing signals 140 on the forward tracks 58 are positioned near the upper edge of the tape and vertical synchronizing signals 141 on the reverse tracks 59 located near the lower edge of the tape. Each signal 140 and 141 is aligned in the longitudinal direction of the tape. To meet the above described two requirements, only the provision of the head servo system is not satisfactory. In the apparatus of this embodiment, there is further employed a capstan servo system as described in the following. This capstan servo system solves the problem of tracking brought in the above (1) and the head servo system solves the problem of alignment of the vertical synchronizing signal brought in the above (2).

FIG.8 shows an embodiment of the servo systems. A standard reference signal from a terminal 150 is supplied to delay circuits 123 and 151. The head servo system 122 compares the phase of the signal from the delay circuit 123 and the tone wheel pulse from the head 45. The system 122 controls the rotation of the rotary disk 38 by the electromagnetic brake 81. This head servo system is the same as the servo system shown in FIG.8.

The reference signal from the terminal 150 may be a vertical synchronizing signal separated from the video signal to be recorded during the recording mode. Or, otherwise this reference may be either a signal obtained from an externally provided video signal or a signal obtained from a built-in oscillator during the reproducing mode.

The control signal reproduced from the control head 53 is supplied, through a switch 152 connected to a contact $C_1$, to a capstan servo circuit 153. At the same time, the signal from the delay circuit 151 is supplied to the servo circuit 153. The servo circuit 153 has a circuit to compare in phase the reference signal with the control signal. The output differential signal from the capstan servo circuit 153 is supplied to and controls the rotation of the motor 60. The servo circuit 153 is designed so that, when the motor 60 is a DC motor, its output level is changed. When the motor 60 is an AC motor, its oscillating frequency is changed. With the motor 60 being thus controlled, the rotation of the capstan 47(33) is similarly controlled. Accordingly, the travelling speed of the magnetic tape 10 is controlled. Thus, the video magnetic heads 14*a* and 14*b* can correctly scan the tracks on the magnetic tape without causing the mis-trackings.

During the virgin recording mode, the switch 152 is changed to a contact $C_2$ which is connected to a head 155 cooperating with a magnet 154 provided in the capstan fly wheel 65(64). The signal from the magnet 154 and the reference signal from the terminal 150 are compared in phase. The capstan servo is performed similarly to the above described case.

A method of detecting the rising or falling of the control signal of the rectangular wave can be employed as described above about the reproducing apparatus. Thereby the control of correct tracking by the capstan servo is performed either in the forward or in the reverse mode. Otherwise, a method of changing the delay amount of the delay circuit 151 according to each mode can be employed as desired.

Figures 12, 13, 14A, 14B:
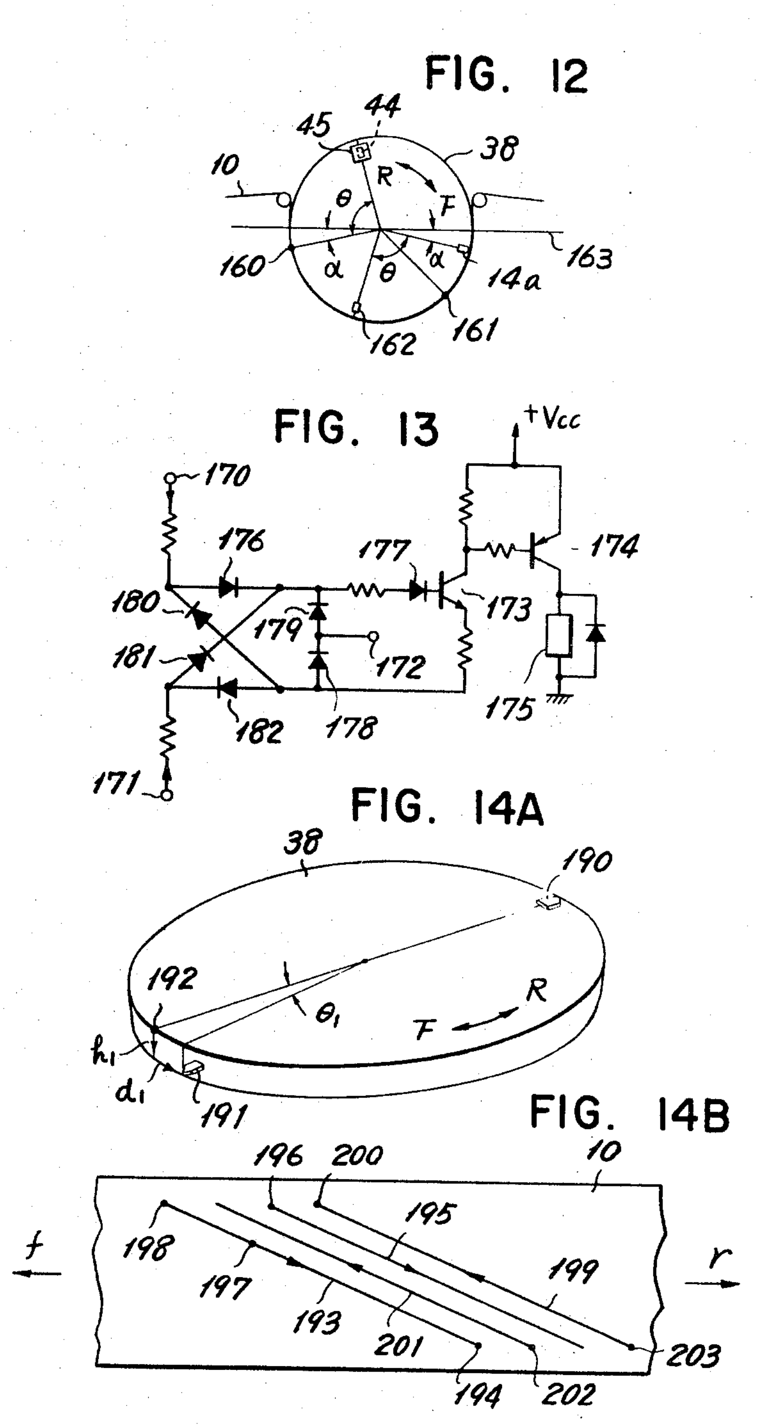
FIG. 12 is a view illustrating the detection of tone wheel pulse for the servo system according to this invention.
FIG.13 is an electric circuit diagram of an embodiment of a protection circuit according to this invention.
FIGS.14A and 14B are respectively diagrammatic perspective views of a rotary head portion and a view of track patterns on the magnetic tape according to this invention applied in a field skip system.

In the head servo system, the delay amount of the delay circuit 123 can be changed in the forward mode or the reverse mode. The detection of the tone wheel pulse may be performed as follows. Assume that the delay amount of the delay circuit 123 in the forward mode is zero. The magnetic head 14*a* must be at a point 160 of an angle $\alpha$ relative to the standard line 163 as shown in FIG.12, at the instant when the tone wheel head 45 detects the magnet 44. Then the magnetic head 14*a* must record the vertical synchronizing signal of the video signal at the point 160. During the reverse mode, the tone wheel pulse must be detected when the magnetic head 14*a* comes to the position of the point 160. However, as the magnet 44 comes to the position of the point 161, the tone wheel pulse cannot be detected. Therefore, the tone wheel head 45 may be located at a position of point 161. Otherwise, another magnet of reverse polarity, as compared to magnet 44, may be provided at a position of point 162 on the rotary disk 38. In this case, the output from the magnet 45 is reversed according to the rotating direction of the rotary disk 38.

If the recording is started before the servo completely enters into synchronism and is servo-locked in, the previously recorded signal track is damaged. Therefore, during the recording mode, it is necessary for the video signal system to remain in the reproducing mode, or at least until the servo is not locked in. An embodiment of its protection circuit is shown in FIG.13.

In FIG.13, transistor 173 becomes conductive if either one of the head servo differential signal from a terminal 170 or the capstan servo differential signal from a terminal 171 has a difference which is more than a predetermined value relative to the comparison signal from a terminal 172. For example, if the potential of the signal from the terminal 170 is larger than the potential of the terminal 172 above a predetermined value, an electric current flows from the terminal 170, through diodes 176 and 177, the base and emitter of the transistor 173 and a diode 178, to the terminal 172. Accordingly, the transistor 173 is conductive. If the potential of the terminal 170 is smaller than the potential of the terminal 172, and electric current flows from the terminal 172, through diodes 179 and 177, the base and emitter of the transistor 173 and a diode 180, to the terminal 170. Accordingly, the transistor 173 is again conductive. The same applies in the case when the potential difference of the terminal 171 and the terminal 172 is over a predetermined value. In this case, electric current flows through a diode 181 or 182. Furthermore, if the impedance is small enough to provide the potentials of the terminals 170 and 171, the potentials of the terminals 170 and 171 do not interfere with each other and prevent their action.

If the transistor 173 is conductive, as described above, a transistor 174 becomes conductive. By the conductivity of the transistor 174, a relay 175 is operated by the voltage +Vcc. By the operation of the relay 175, the video signal system is changed to a reproducing mode. Accordingly, in case the servo system is not locked in and the differential output of the terminals 170 and 171 is over a predetermined value, only the signal system is in the reproducing mode even during the recording mode. As soon as the servo system enters synchronism and is locked in, the signal system comes into a recording mode for the first time.

By use of the apparatus of this invention, the electronic editing is easily accomplished. The servo system is not concerned over whether or not it is in the recording mode or in the reproducing mode. Assume that a program PROI signal is already recorded on the magnetic tape and midway therein another program PROII signal is inserted for editing. Then, the PROII signal is added to the signal system before the editing point. The servo system is locked with the PROII signal to take the reproducing mode. At a desired editing time point, the reproducing mode is changed to the recording mode. Consequently, the PROI signal is erased midway therein and the PROII signal is thereafter recorded. At this instant a, synchronizing disturbance is not produced at the editing time point.

(III) APPLICATION TO A FIELD SKIP SYSTEM

The field skip system is, as seen in the specification of the U.S. Pat. No. 3,391,248, related to a system in which fields of the video signal is recorded in every other field by one rotary magnetic head. In the system, each recorded field is reproduced every two times by two rotary magnetic heads which are alternately activated. This field skip system can be applied to the system of the present invention.

FIG.14A illustrates magnetic heads on the rotary disk used in the apparatus of the field skip system. Recording and reproducing magnetic heads 190 and 191 are provided on the rotary disk 38 in opposite positions as shown in the figure. These heads scan the same track on the travelling magnetic tape. The magnetic head 191 is offset at the angle $\theta_1$, height $h_1$, and distance $d_1$ from the opposite point in the diametral direction to the magnetic head 190.

During the forward mode, it is assumed that the magnetic head 190 scans over a track 193 on the magnetic tape 10 as shown in FIG.14B and reaches a point 194. At this time, in case the magnetic head 191 is at a point 192 on the rotary disk 38, the magnetic head 191 is at a point 196 at the start of a succeeding track. Practically, however, the magnetic head 191 is offset in height $h_1$ from the point 192 so that it remains at a point 197. Also, the magnetic head 191 is shifted in a distance $d_1$ to remain at a point 198. Consequently, the magnetic head 191 can re-scan the same track 193 that the magnetic head 190 has already scanned. The same applies in the case of the track 195 and other tracks.

Then, during the reverse mode, it is assumed that the magnetic head 191 accomplishes a scanning over the track 199 and reaches a point 200. At this instant, in case the magnetic head 190 is disposed in a position symmetrical to the magnetic head 191, the magnetic head 190 is at a start point 202 of a track 201. However, as the magnetic heads 190 and 191 are in the positions relative to each other as shown in FIG.14A, the magnetic head 190 is at a start end 203 of the track 199. Accordingly, the track 199 is scanned twice by the magnetic heads 190 and 191. Similarly, other tracks are also reproduced twice in time.

Therefore, in the field skip system, the order of scanning of the heads are reversed for the forward mode and the reverse mode. However, both modes can be applied to the field skip recording and reproducing.

According to this field skip system, the erasing magnetic heads may be provided at the front and rear parts of only the magnetic head 190 or 191. Then, only two erasing magnetic heads are sufficient for the present purpose.

As will be apparent from the principle and description as set forth under items of (I), (II) and (III), it will be understood that the invention has the following outstanding features:

1. The apparatus can endlessly and continuously record and/or reproduce desired recording video signals on the magnetic tape;
2. When continuously reproducing the all signals recorded on the magnetic tape, the apparatus reproduces even during the reverse mode. Thus, the conventional rewinding operation of the magnetic tape is not necessitated. The system can more conveniently be used particularly in the cartridge type VTR apparatus;
3. Content of the recorded signals both at the beginning end and the terminating end can be readily known, if the signals at the beginning end of the magnetic tape are reproduced as forward reproducing mode and reverse reproducing mode in a short period of time. Accordingly, the search for the content of informations of the previously recorded signals is very easy and quickly performed;
4. As the apparatus can perform endless recording and reproducing, the recording capacity cannot be reduced although the travelling speed of the magnetic tape is increased. Further a good picture image can be obtained with less wow, flutter, or jitter;
5. Easy and correct electronic editing of signals can be performed effectively.

The recording is stopped at a desired time point during continuous and endless recording. Then during reproduction of the recorded signals, it will be possible to reproduce the contents of the forward and reverse recording capacity of the magnetic tape for tracing back from the stop point. Accordingly, in one instance, the apparatus can be used with the video camera directed to a crossing of roads. The apparatus continues its endless recording and, if an accident occurs at the place, the recording can be stopped and the recorded signals are reproduced in tracing back the recorded signals of the occurrence of the accident. Thus, the apparatus incorporating this invention can also be used for the supervision in the bank, collection of car tolls on the express ways, and inspection of troubles in the industrial plants. The apparatus is further used for recording and reproducing the object in which a desired reproducing time point is uncertain.

Furthermore, this invention is not limited to these embodiments but various variations and modifications may be made without departing from the scope and spirit of the invention.

What I claim is:

1. A continuously scanning television magnetic recording system which comprises a magnetic tape, means comprising at least one rotary magnetic head for scanning over the magnetic tape with tracks oblique to the longitudinal direction of the tape, means for operating said system in either a forward mode or a reverse mode, means responsive to operation in said forward mode for causing the magnetic tape to travel in one direction and for rotating the rotary magnetic head in one direction for effecting a forward scanning on the magnetic tape by the rotary magnetic head, means responsive to operation in said reverse mode for causing the magnetic tape to travel in a direction which is reverse to the one direction and for rotating the rotary magnetic head in a direction to the one direction for effecting a reverse scanning on the magnetic tape by the rotary magnetic head, means for reversing respectively the travelling direction of the magnetic tape and the rotating direction of the rotary magnetic head when the rotary magnetic head has accomplished the forward scanning or reverse scanning on the magnetic tape, and means responsive to a control signal recorded on said tape for controlling the travelling speed of the magnetic tape and the rotating speed of the rotary magnetic head for locating the tracks scanned during said reverse mode midway between the tracks scanned during said forward mode.

2. A continuously scanning magnetic recording system in the system of claim 1 in which said rotary magnetic head is a rotary recording magnetic head and forms recording tracks on the magnetic tape both during the forward scanning mode and the reverse scanning mode.

3. The system of claim 2 in which said recording magnetic head comprises means forming a first plurality of parallel tracks directed from one edge to the other edge of the tape, said tracks being obliquely oriented to its longitudinal direction on the magnetic tape during the forward scanning mode , and means forming a second plurality of parallel tracks directed from the other edge to the one edge of the tape in parallel and alternate with the first tracks during the reverse scanning mode.

4. The system of claim 1, wherein the magnetic tape has a plurality of first parallel tracks directed from one edge to the other edge of the tape, said tracks being obliquely oriented to its longitudinal direction and a second plurality of parallel tracks directed from the other edge to the one edge of the tape in parallel and alternate with the first racks.

5. The continuous magnetic reproducing system in the system of claim 1 in which said magnetic tape has recorded tracks, and said rotary magnetic head is a rotary reproducing magnetic head for producing the recorded tracks on the magnetic tape both during the forward scanning mode and the reverse scanning mode.

6. The continuous recording and reproducing system in the system of claim 1 in which said rotary magnetic head is a rotary recording and reproducing magnetic head forming recorded tracks on the magnetic tape during both the forward scanning mode and the reverse scanning mode and reproducing signals from the recorded tracks on the magnetic tape.

7. The system of claim 2 in which said rotary recording magnetic head is provided on a rotary body and further erasing magnetic heads are provided on both sides of the rotary recording magnetic head on the rotary body.

8. The system of claim 1 which has further means for detecting the end of the magnetic tape, means responsive to a detection of an output of the detecting means for stopping the travel of the magnetic tape and the rotation of the rotary magnetic head, and means operated a predetermined delay time after the action of the stopping means for actuating the reversing means.

9. The system of claim 1 and servo means for causing the rotary magnetic head to scan said tape during the reverse scanning mode , said scan during reverse operation following tracks which are recorded in parallel and alternate with the tracks scanned during the forward scanning mode.

10. The system of claim 2 and means for preventing the supplying of a recording signal to the rotary recording magnetic head until the travel of the magnetic tape and the rotation of the rotary recording magnetic head enter into synchronization when the travelling direction of the magnetic tape and the rotary direction of the rotary recording magnetic head are reversed by action of the reversing means.

11. The system of claim 1 and a field skip system means for recording the video signal in every other field by one magnetic head , and means for reproducing each recorded signal track two times by two magnetic heads during the reproducing mode.

12. A continuously scanning apparatus operative in a forward mode or a reverse mode, said apparatus comprising a magnetic tape, means comprising at least one rotary magnetic head scanning over the magnetic tape with tracks recorded obliquely with respect to the longitudinal direction of the tape, means responsive to operation in said forward mode for causing the magnetic tape to travel in one direction and for rotating the rotary magnetic head in one direction for effecting a forward scanning on the magnetic tape by the rotary magnetic head, means responsive to operation in said reverse mode for causing the magnetic tape to travel in a direction which is reverse to the one direction and for rotating the rotary magnetic head in a direction which is reverse to the one direction for effecting reverse scanning on the magnetic tape by the rotary magnetic head, means for reversing respectively the travelling direction of the magnetic tape and the rotating direction of the rotary magnetic head when the rotary magnetic head has finished either a forward scanning or reverse scanning on the magnetic tape , and means responsive to a control signal recorded on the magnetic tape for rotating direction of the rotary magnetic head when the rotary magnetic head has finished either a forward scanning or reverse scanning on the magnetic tape, and means responsive to a control signal recorded on the magnetic tape for controlling the travelling speed of the magnetic tape and the rotating speed of the rotary magnetic head for locating the tracks scanned during said reverse mode midway between the tracks scanned during said forward mode.

* * * * *